US007764673B1

(12) United States Patent
Asawa et al.

(10) Patent No.: US 7,764,673 B1
(45) Date of Patent: *Jul. 27, 2010

(54) SYSTEM AND METHOD FOR IMPLEMENTING A VARIABLE SIZE CODEBOOK FOR COMPRESSION IN A COMMUNICATIONS ENVIRONMENT

(75) Inventors: Manjari Asawa, Cupertino, CA (US);
Tmima Koren, Cupertino, CA (US);
Jagdish V. Sonti, Cupertino, CA (US);
Uwe Sellentin, Woodside, CA (US)

(73) Assignee: Cisco Technology, Inc., San Jose, CA (US)

( * ) Notice: Subject to any disclaimer, the term of this patent is extended or adjusted under 35 U.S.C. 154(b) by 908 days.

This patent is subject to a terminal disclaimer.

(21) Appl. No.: 10/912,675

(22) Filed: Aug. 4, 2004

(51) Int. Cl.
*H04L 12/28* (2006.01)

(52) U.S. Cl. .................. 370/389; 370/232; 370/235; 341/90; 341/107; 341/173

(58) Field of Classification Search ............... 370/474, 370/351–356, 401–402, 392, 458, 475; 382/233; 341/90, 106, 51, 107, 173–175; 348/423.1; 340/7.53
See application file for complete search history.

(56) References Cited

U.S. PATENT DOCUMENTS

| 4,843,389 | A | * | 6/1989 | Lisle et al. ................. 341/106 |
| 5,396,228 | A | * | 3/1995 | Garahi ....................... 340/7.53 |
| 5,663,721 | A | * | 9/1997 | Rossi ........................... 341/51 |
| 5,894,557 | A | | 4/1999 | Bade et al. ............. 395/200.58 |
| 6,134,245 | A | | 10/2000 | Scarmalis .................... 370/474 |
| 6,191,710 | B1 | * | 2/2001 | Waletzki ....................... 341/63 |
| 6,192,051 | B1 | | 2/2001 | Lipman et al. .............. 370/389 |
| 6,363,065 | B1 | | 3/2002 | Thornton et al. ............ 370/352 |
| 6,400,722 | B1 | | 6/2002 | Chuah et al. ................ 370/401 |
| 6,477,595 | B1 | | 11/2002 | Cohen et al. ................ 710/105 |
| 6,512,754 | B2 | | 1/2003 | Feder et al. ................. 370/338 |
| 6,512,773 | B1 | | 1/2003 | Scott ..................... 370/395.61 |
| 6,788,707 | B1 | * | 9/2004 | Horton et al. ............... 370/474 |
| 7,088,398 | B1 | * | 8/2006 | Wolf et al. ................ 348/423.1 |
| 7,457,315 | B1 | * | 11/2008 | Smith ......................... 370/473 |
| 7,643,652 | B2 | * | 1/2010 | Srinivasan .................. 382/100 |
| 2002/0048287 | A1 | * | 4/2002 | Silvers ........................ 370/535 |
| 2003/0044074 | A1 | * | 3/2003 | Weiss et al. ................. 382/233 |
| 2003/0133441 | A1 | * | 7/2003 | Watanabe et al. ........... 370/352 |
| 2004/0008650 | A1 | * | 1/2004 | Le et al. ..................... 370/338 |
| 2008/0118007 | A1 | * | 5/2008 | Fussell et al. ............... 375/340 |

* cited by examiner

*Primary Examiner*—Aung S Moe
*Assistant Examiner*—Vinncelas Louis
(74) *Attorney, Agent, or Firm*—Baker Botts L.L.P.

(57) ABSTRACT

A method for communicating data is provided that includes receiving a plurality of bits associated with a communications flow and applying a variable size codebook for stateful compression or for stateless compression. The method also includes determining if a match exists between the plurality of bits and a selected one of a plurality of bit patterns and communicating a payload present (PP) header bit pattern corresponding to the selected bit pattern in place of the plurality of bits associated with the communications flow.

29 Claims, 3 Drawing Sheets

SYSTEM AND METHOD FOR IMPLEMENTING A VARIABLE SIZE CODEBOOK FOR COMPRESSION IN A COMMUNICATIONS ENVIRONMENT

TECHNICAL FIELD OF THE INVENTION

The present invention relates in general to the field of communications and, more particularly, to a system and a method for implementing a variable size codebook for compression in a communications environment.

BACKGROUND OF THE INVENTION

Communication systems and architectures have become increasingly important in today's society. One aspect of communications relates to maximizing bandwidth and minimizing delays associated with data and information exchanges. Compression operations may be used by network operators to produce high percentages of bandwidth saving for any given transport that is being implemented. In certain scenarios, network operators may consider compressing common communication patterns that appear on a given communication link.

Many architectures for effectuating proper data exchanges add significant overhead and cost in order to accommodate a large number of end-users or data streams. For example, a large number of T1/E1 lines may be implemented to accommodate heavy traffic, but such lines are generally expensive and, thus, usage of each one should be maximized (to the extent that it is possible) in order to achieve optimal system performance. Currently, various proposals for backhaul compression schemes use a fixed payload present (PP) header size to indicate various compressed and uncompressed scenarios. This generally results in loss of bandwidth gain for the average case scenario. Moreover, this produces a bandwidth expansion in a high user activity environment. Depending on the algorithm used (stateful or stateless) such an approach also has additional drawbacks, as detailed throughout this document. Accordingly, the ability to provide a communications system that consumes few resources, optimizes bandwidth, and achieves minimal delay presents a significant challenge for network operators, service providers, and system administrators.

SUMMARY OF THE INVENTION

From the foregoing, it may be appreciated by those skilled in the art that a need has arisen for an improved compression approach that optimizes data exchanges in a communications environment. In accordance with one embodiment of the present invention, a system and a method for providing variable size codebook based coding for stateful and stateless compression environments are provided that substantially eliminate or greatly reduce disadvantages and problems associated with conventional compression techniques.

According to one embodiment of the present invention, there is provided a method for communicating data that includes receiving a plurality of bits associated with a communications flow and applying a variable size codebook for stateful compression or stateless compression schemes. The method also includes determining if a match exists between the plurality of bits and a selected one of a plurality of bit patterns and communicating a payload present (PP) header bit pattern corresponding to the selected bit pattern in place of the plurality of bits associated with the communications flow.

Certain embodiments of the present invention may provide a number of technical advantages. For example, according to one embodiment of the present invention, a communications approach is provided that enhances bandwidth parameters for a given architecture. This is a result of the communications scheme, which provides bandwidth gains via pattern matching operations. A given input bit stream may be matched to a bit pattern, which can be used to represent (and thereby minimize communication of) the stream. Moreover, by using a variable rate mapping table, the efficiency of the proposed scheme can be vastly improved: higher improvements being executed exactly when they are needed (e.g. high user activity scenarios).

Furthermore, the bandwidth expansion (for the case when a significant number of end-users are talking) can be reduced (e.g. to about 4% vs. about 8.5% of the previous scheme for the sixteen kbps submultiplexed case). Even more reduction is achieved for the eight kbps submultiplexed case. This may be achieved without any increase in the complexity of multiplexing and demultiplexing schemes. Such advantages may be particularly beneficial to service providers, as effective compression protocols significantly reduce their operating expenditures.

This enhancement is flexible in that it can be extended to include other compressible, repetitive patterns without any bandwidth expansion at high utilization times. Thus, such a solution can be easily extended to signaling and packet data channels. Hence, minimal overhead is incurred as a result of the operations of the present invention. This further allows such a configuration to accommodate a wide range of incoming flows, as it may be extended to a number of different types of traffic arrangements. Furthermore, the proposed scheme also helps a given network operator to provision links for higher bandwidth utilization (e.g. closer to 85% rather than about 75% utilization) without increasing the risk of congestion. This is because, at the higher utilization, the bandwidth expansion is reduced and, hence, the required margin could be made smaller.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which.

DETAILED DESCRIPTION OF THE INVENTION

Figure 1:
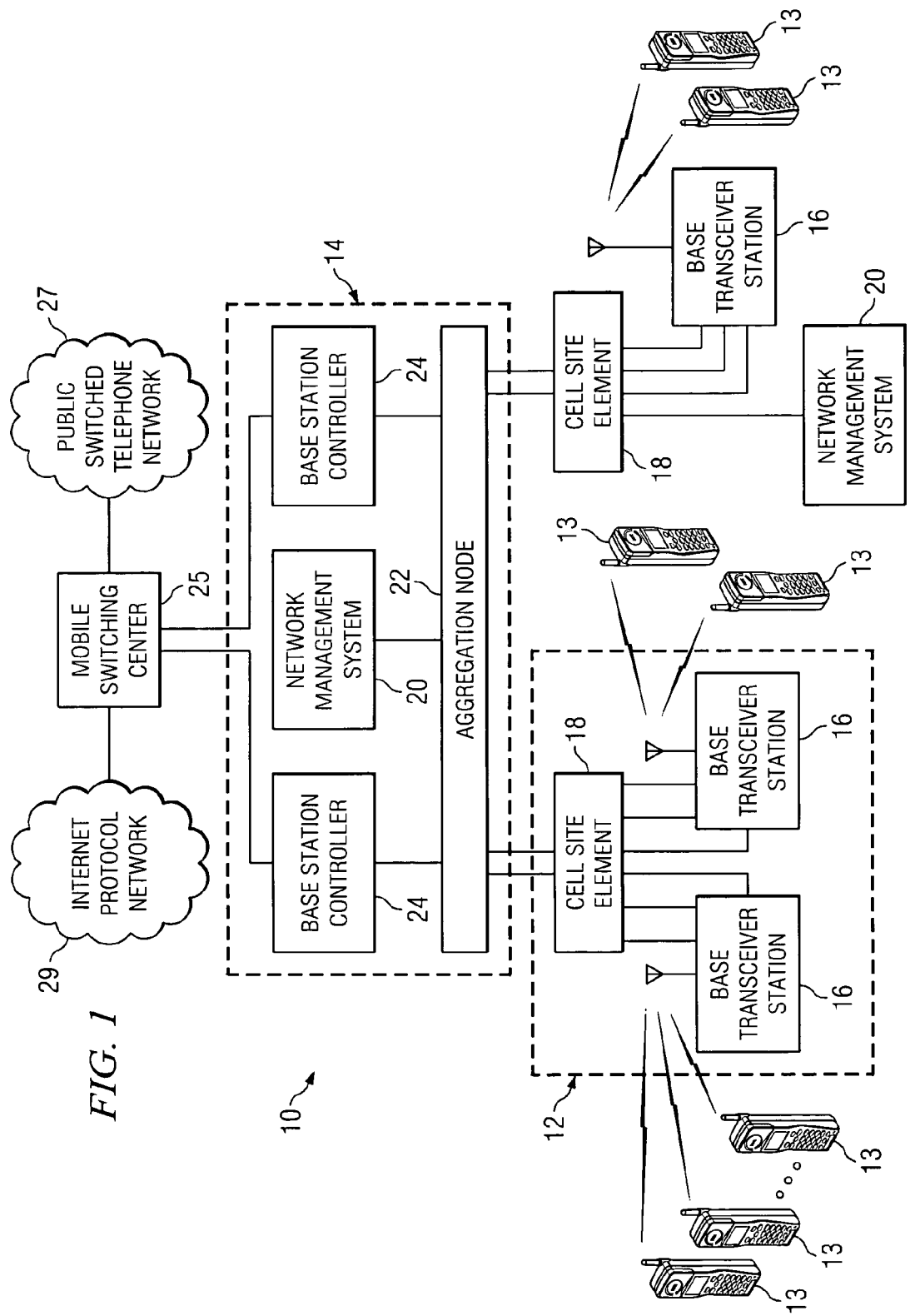
FIG. 1 is a simplified block diagram of a communication system for implementing a variable size codebook.

FIG. 1 is a simplified block diagram of a communication system 10 for the code-based compression of data in a communications environment. Communication system 10 may include a plurality of cell sites 12, a plurality of mobile stations 13, a central office site 14, a plurality of base transceiver stations 16, a plurality of cell site elements 18, and a network management system 20. Additionally, communication system 10 may include an aggregation node 22, a plurality of base station controllers 24, a mobile switching center 25, a public switched telephone network (PSTN) 27, and an Internet protocol (IP) network 29. Note that there is a disproportionate number of communications links extending between cell site element 18 and aggregation node 22, as compared to the number of communication links extending between cell site element 18 and base transceiver stations 16. This arrangement has been provided in order to illustrate a compression scenario being achieved by communication system 10.

Communication system 10 may generally be configured or arranged to represent a 2.5 G architecture applicable to a Global System for Mobile (GSM) environment in accordance with a particular embodiment of the present invention. However, the 2.5 G architecture is offered for purposes of example only and may alternatively be substituted with any suitable networking system or arrangement that provides a communicative platform for communication system 10. For example, the present invention may be used in conjunction with data communications, such as those that relate to packet data transmissions. Additionally, communication system 10 may be provided in a 3 G network, where 3 G equivalent networking equipment is provided in the architecture. Communication system 10 is versatile in that it may be used in a host of communications environments such as in conjunction with any time division multiple access (TDMA) element or protocol for example, whereby signals from end-users, subscriber units, or mobile stations 13 may be multiplexed over the time domain.

In accordance with the teachings of the present invention, a variable size codebook approach to compression is offered on a per-call or per-flow basis.

The use of a variable size codebook for GSM compression results in higher efficiency gain when it is most needed (i.e. for the high user activity scenarios). A one bit codebook (e.g. 1) is assigned for the case when the data can not be compressed and, hence, needs to be transmitted to the other end, whereas a codebook of two or more bits (e.g. 01, 001, 000, etc.) can be assigned for the cases when the data is compressed and, thus, not transmitted. For the codebooks beginning with zero, the assignment is such that the higher the likelihood of the pattern to be compressed, the smaller the associated codeword.

Thus, an incoming bit pattern may be evaluated to determine its corresponding bit pattern match. A header may then be used to indicate that the incoming stream matches one of the predefined patterns. The predefined patterns have previously been identified as common: in the context of establishing the patterns to be potentially identified by the architecture. The input bit pattern may be subsequently removed, whereby only the header bits are sent to represent the input stream. Such header codes may reflect common communications streams that are found propagating in the network most often. This recognition and matching (of more prevalent streams) would allow the greatest savings to compression operations. In cases where no match exists for the incoming pattern, a header may be provided that reflects this condition. In such a case, the entire bit pattern could then be sent, as the architecture would be unable to represent all of the diverse bit pattern with fewer bits than currently provided to represent the incoming stream. A demultiplexer positioned downstream may then simply perform a series of reverse operations.

Such an approach uses a variable size codebook mapping table that allows the efficiency of the proposed scheme to be improved. Moreover, using such a protocol, communication system 10 provides a simplistic solution for reducing compression and decompression operations. In addition to creating minimal overhead and being easy to implement (with potential modifications only being made to aggregation node 22 and cell site element 18), such an approach could cooperate with any suitable compression protocol or arrangement.

Note that for purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

A stateful scheme with a payload present (PP) header size of just one bit cannot reliably reproduce the traffic stream propagating from the ingress side to the egress side, without compromising bandwidth efficiency gains. This is because one bit can only represent two cases: 1) payload present; or 2) payload not present. Since there are multiple bit patterns that can be compressed and since it is not possible to reproduce them with just a state machine, a significant percentage of achievable bandwidth gain is lost. However, if multiple fixed numbers of PP bits are used, then this results in a loss of efficiency due to the large PP header size.

There is additional loss when multiple levels of submultiplexing are used, such as: 8K, 16K, 32K, or 64K. In this case, eight bits are needed per DS0 to indicate the type of multiplexing, and an additional eight, sixteen, or thirty-two bits to represent the state for the fixed PP header size scenario. For example, a variable length PP header can save about 12% efficiency in this case. Further, it is possible to suppress the submultiplexing header, when it does not change from one interval to another: one bit in the control header indicating this condition.

A fixed PP header size of two or more bits can reproduce the signal for a stateful or a stateless compression scheme quite well. However, this may result in a bandwidth expansion (e.g. about 8.5% for the 16 kbps submultiplexed case and 16% for the 8 kbps submultiplexed case) in the high end-user activity scenarios (e.g. smaller silence time, large number of end-users with music on hold, etc.). Without implementing a variable size codebook, it is impractical to support any mixture of eight kbps subrate channels in a GSM multiplex (GSMmux) solution because of the efficiency loss. Further, it limits the number of possible compressed patterns, thereby compromising an achievable efficiency gain. The variable length codebook scheme offered by communication system 10 solves the above-described problems, as well as results in better efficiency gains.

Communication system 10 implements a variable length codebook (an example of which is provided in FIG. 2) that is used to indicate various compressed and uncompressed patterns. This stands in contrast to use of a fixed length codebook, which has a number of drawbacks as outlined above. In general, the basic idea of the scheme is that a sample of certain bit size (e.g. 16 bits, 32 bits, etc.) is collected per subrate signal zero (DS0) that needs to be compressed. The variable length codebook is then applied. To achieve the least bandwidth expansion for the high end-user scenario, the codebook should be one bit when the payload is not compressed and then sent as it is. The codebook is generally more than one bit for the cases when some of the bits are compressed.

For example, a codebook pattern with a value of 1 may indicate that the corresponding voice/data bits that are present are uncompressed. Codeword patterns such as 01, 000, 001, etc. can indicate that all or some of the payload is compressed.

Note that for the latter case, the codebooks will be such that the prefix of a codeword cannot be another codeword.

The above scheme has very significant advantages depending on the stateful or stateless compression schemes being used. In particular, it allows efficient compression even when: 1) the submultiplexing scheme is any combination of 8 Kbps, 16 Kbps, 32 Kbps, or 64 Kbps subrate DS0s (and the submultiplexing scheme can change with time); and 2) it is not possible to uniquely distinguish a time alignment filler one bit, alarms patterns of all 0s, synchronization bits, and idle patterns of 0101, etc. using just the state machine. Using a combination of a variable size codeword with a state machine, communication system 10 can distinguish the above patterns and compress cases that were not compressed before.

In this scheme, various compressed scenarios are distinguished by means of variable size unique codebooks for the cases where the compressed patterns cannot be distinguished by the state machine. Based on the particular state machine used, tables outlined for the stateless schemes may be used. Further, it is possible to encode the PP header bits in two parts. The first part can indicate the type of submultiplexing. The second part of the PP bits will depend on the state machine, which could be different for different subrates. The first part of the PP header may define the second part of the PP header. Since the submultiplexing scheme may not change every sampling interval (e.g. 2 ms), it is also possible to suppress the first part when it does not change from the previous interval. This can be indicated by one bit in the control header. In a typical voice call scenario, the combination of these two schemes can almost double the efficiency achieved with a fixed size PP header.

In the context of advantages, for example, bandwidth expansion parameters (for the case when significant number of end-users are engaged in active voice calls) can be reduced to about 4% vs. about 8.5% for a sixteen kbps submultiplexed case. Even more reduction is achieved for an eight kbps submultiplexed case. This may be executed without any increase in the complexity of multiplexing and demultiplexing operations.

The architecture of communication system 10 can also be extended to include other compressible, repetitive patterns without any bandwidth expansion at high utilization times. Thus, the configuration can be extended to signaling and packet data channels, where appropriate. The offered scheme may also help network operators to better provision bandwidth at a higher utilization (e.g. closer to 85%, rather than about 75%) without increasing the probability of link congestion. This is due to the fact that, at the higher utilization times, the bandwidth expansion is reduced and, therefore, the required margin could be made smaller.

Mobile station 13 may be used to initiate a communication session that may benefit from such a compression protocol. Mobile station 13 may be an entity, such as a client, subscriber, end-user, or customer that seeks to initiate a data flow or exchange in communication system 10 via any suitable network. Mobile station 13 may operate to use any suitable device for communications in communication system 10. Mobile station 13 may further represent a communications interface for an end-user of communication system 10. Mobile station 13 may be a cellular or other wireless telephone, an electronic notebook, a computer, a personal digital assistant (PDA), or any other device, component, or object capable of initiating a data exchange facilitated by communication system 10. Mobile station 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile station 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as mobile station 13 for example. Base transceiver stations 16 may also be coupled to base station controllers 24 (via one or more intermediate elements) that use a landline (such as a T1/E1 line, for example) interface. Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a transcoding and rate adaptation unit (TRAU)) positioned between mobile switching center 25 and base station controllers 24.

In operation, communication system 10 may include multiple cell sites 12 that communicate with mobile stations 13 using base transceiver stations 16 and cell site element 18. Central office site 14 may use aggregation node 22 and base station controllers 24 for communicating with cell site 12. One or more network management systems 20 may be coupled to either cell site 12 and central office site 14 (or both as desired), whereby mobile switching center 25 provides an interface between base station controllers 24 (of central office site 14) and PSTN 27, IP network 29, and/or any other suitable communication network. Base transceiver stations 16 may be coupled to cell site element 18 by a T1/E1 line or any other suitable communication link or element operable to facilitate data exchanges. A backhaul connection between cell site element 18 and aggregation node 22 may also include a T1/E1 line or any suitable communication link where appropriate and in accordance with particular needs.

Base station controllers 24 generally operate as management components for a radio interface. This may be done through remote commands to a corresponding base transceiver station within a mobile network. One base station controller 24 may manage more than one base transceiver stations 16. Some of the responsibilities of base station controllers 24 may include management of radio channels and assisting in handoff/handover scenarios.

In operation, layer one based (e.g. time division multiplexed (TDM), GSM, 8.60) or layer two based (e.g. Frame Relay, high level data link control (HDLC), asynchronous transfer mode (ATM), point to point protocol (PPP) over HDLC) traffic may be communicated by each base transceiver station 16 to cell site element 18 of cell site 12. Cell site element 18 may also receive IP or Ethernet traffic from network management system 20. Cell site element 18 may multiplex together payloads from the layer two based traffic that have a common destination. The multiplexed payloads, as well as any payloads extracted from the network management system IP or Ethernet traffic may be communicated across a link to aggregation node 22 within central office site 14.

Aggregation node 22 may demultiplex the payloads for delivery to an appropriate base station controller 24 or network management system 20.

Mobile switching center 25 operates as an interface between PSTN 27 and base station controllers 24, and potentially between multiple other mobile switching centers in a network and base station controller 24. Mobile switching center 25 represents a location that generally houses communication switches and computers and ensures that its cell sites in a given geographical area are properly connected. Cell sites refer generally to the transmission and reception equipment or components that connect elements such as mobile station 13 to a network, such as IP network 29 for example. By controlling transmission power and radio frequencies, mobile switching center 25 may monitor the movement and the transfer of a wireless communication from one cell to another cell and from one frequency or channel to another frequency or channel. In a given communication environment, communication system 10 may include multiple mobile switching centers 25 that are operable to facilitate communications between base station controller and PSTN 27. Mobile switching center 25 may also generally handle connection, tracking, status, billing information, and other user information for communications in a designated area.

PSTN 27 represents a worldwide telephone system that is operable to conduct communications. PSTN 27 may be any land line telephone network operable to facilitate communications between two entities, such as two persons, a person and a computer, two computers, or in any other environment in which data is exchanged for purposes of communication. According to one embodiment of the present invention, PSTN 27 operates in a wireless domain, facilitating data exchanges between mobile station 13 and any other suitable entity within or external to communication system 10.

IP network 29 is a series of points or nodes of interconnected communication paths for receiving and transmitting packets of information that propagate through communication system 10. IP network 29 offers a communications interface between mobile stations 13 and any other suitable network equipment. IP network 29 may be any local area network (LAN), metropolitan area network (MAN), wide area network (WAN), wireless local area network (WLAN), virtual private network (VPN), or any other appropriate architectural system that facilitates communications in a network environment. IP network 29 implements a transmission control protocol/Internet protocol (TCP/IP) communication language protocol in a particular embodiment of the present invention. However, IP network 29 may alternatively implement any other suitable communications protocol for transmitting and receiving data packets within communication system 10.

In operation of a sample (simplified) flow of FIG. 1, communication system 10 offers a variable codebook mechanism for compression optimization. The incoming bit pattern may be evaluated to determine its corresponding match. A PP header may then be used to indicate that the incoming stream is a pattern with a corresponding match. In cases where no match exists for the incoming stream, a header may be provided that reflects this condition. The header for the unmatched stream could effectively signal that a bit pattern is forthcoming and (inferentially) that the bit pattern could not be properly represented by any of the designated header bits. A demultiplexer (positioned downstream of the flow) may then simply perform reverse operations. For example, the demultiplexer may recognize the pattern and determine whether the stream has been matched. In cases where the stream was represented with a smaller component (i.e. the header), the PP header bits reveal the data that was within the stream. The data may then be restored and communicated to a subsequent destination. These operations achieve a simple and accurate procedure for compressing data, which is found to be commonly propagating in the network.

Figure 2:
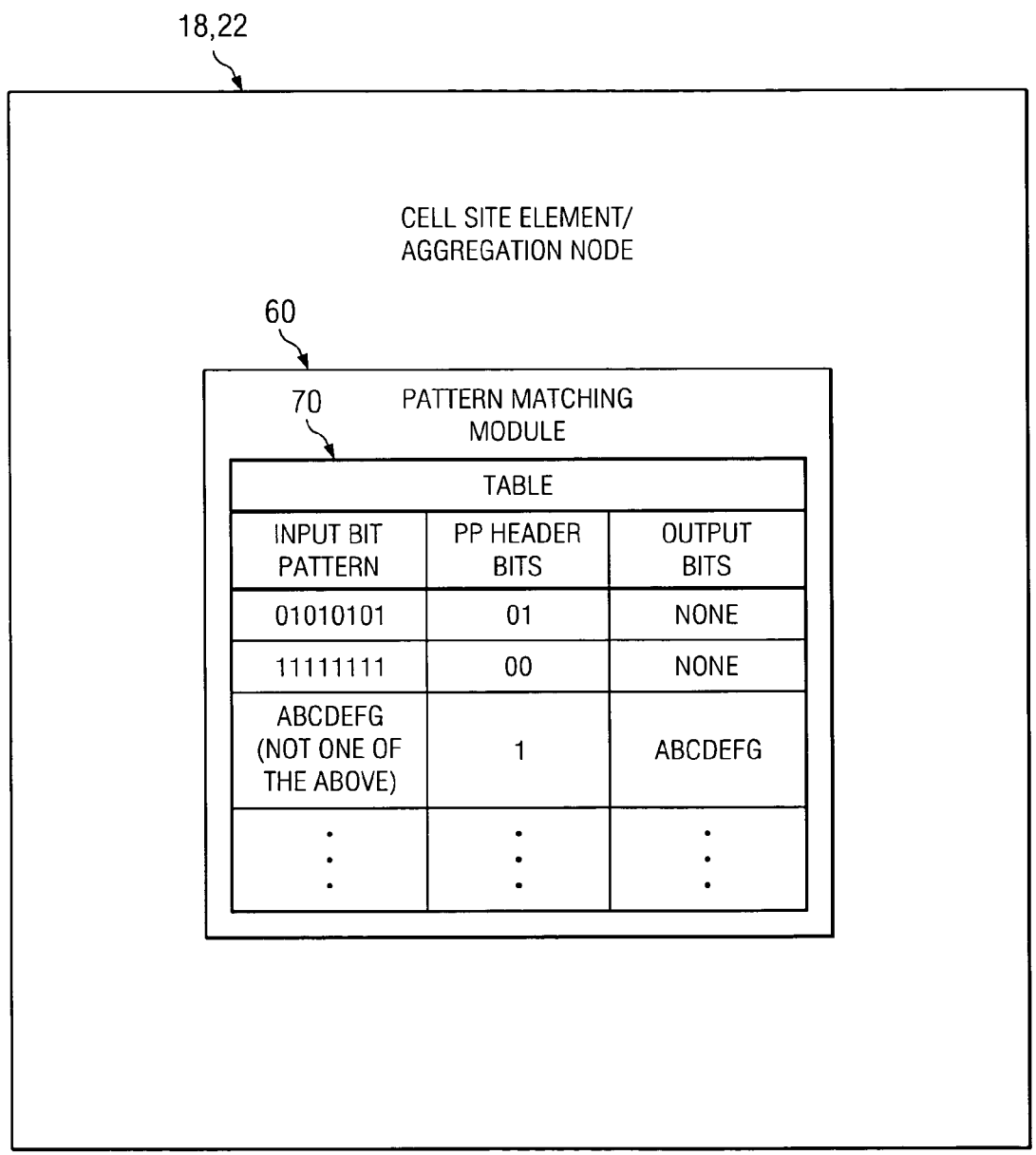
FIG. 2 is a block diagram of an example internal structure associated with either a cell site element or an aggregation node of the communication system.

FIG. 2 is a simplified block diagram of an example internal structure of either cell site element 18 or aggregation node 22 or both that includes a variable size codebook. An example of a mapping table to be used for a stateless compression scheme is provided in FIG. 2. The example of FIG. 2 includes one possible mapping is shown in table 70. Table 70 includes three columns reflecting a series of input bit patterns, a series of PP header bits (or header bit segments), and a series of corresponding output bit patterns. Other patterns or combinations may be used for any particular need or purpose.

The functional flow of communication system 10 may follow a bits in/bits out protocol, being dependent only on the received bit pattern. Input DS0s may be demultiplexed to create an appropriate number of subrate DS0s, each corresponding to a different call. For each subrate DS0, a certain portion (e.g. two milliseconds) of samples may be collected synchronously. Because the corresponding inputs are time-division multiplexed (TDM) streams, the collection operation should be completed at roughly the same time. For sixteen kilobits/sec multiplexing, this results in a collection of four bytes of data from each stream at about the same time.

The collected samples may be compared to a few pre-identified patterns (e.g. the most commonly occurring input streams) and decisions may be made regarding which bits are to be compressed with corresponding header bits representing the match result. The receiving end may then perform reverse operations in undoing the matching in order to restore the bit stream and communicate it to its intended next destination.

A demultiplexer/decompressor may perform tasks in reverse in order to undo what was done by the compressor and multiplexer. Stateless decompression may be achieved in that each stream does not require a state to be maintained for demultiplexing purposes.

TDM streams may be TDM multiplexed to generate appropriate DS0s, which are further combined with drop-and-insert DS0s to create T1/E1s. Based on the header of the overall multiplexed packet, appropriate line conditions or alarms are generated at the output T1/E1 interface. Note that in order to increase robustness in the presence of errors, it is possible to protect payload header bits by a forward error correcting code and dropping the cyclic redundancy check (CRC) from point to point protocol (PPP) frames. An example of a simple error correcting method could be a table-based parity method, which can correct all one bit errors.

For stateless compression schemes, instead of having two bits of overhead when data/voice sample needs to be transmitted, only one bit of overhead is present. Since the less overhead bits are important when data is present, this scheme reduces bandwidth expansion in high end-user scenarios considerably. For example, to compress 16 DSOs, 16×4×2=128 bits of PP header will generally be required in normal schemes (versus 64 bits in the proposed scheme for the high user-activity scenario).

The variable size codebook can also be easily expanded to include other frequently occurring patterns. In general, the more frequent the pattern, the smaller the codebook that is assigned. The exception to this axiom is the pattern that does not match any of the defined patterns, which requires the data bits to be transmitted. This will generally have a code value of 1, whereas all the other well known patterns will have a code value starting with 0, such as 01, 000, 001, etc. Note that the above scheme might result in a PP header size (in bits) that is not an integer multiple of an octet (for both stateful and stateless compression schemes).

For efficient processing of a PP header and corresponding data at the compressor and decompressor, byte alignment of a PP header may be required. To achieve byte alignment, a number of bits (1s) may be added at the end of PP header such that byte alignment is achieved. Note that the additional number of bits added to achieve byte alignment will generally be less than or equal to seven bits. Since the receiver side will run out of the received pattern (even in the presence of is), the demultiplexing operation will work properly with the added provision to discard the left over one bits in the PP header.

Due to a variable size packet length, there may need to be a direct or an indirect way to determine length of PP header. A direct possibility is to include a five-bit length field for the case with a maximum codebook size of two bits. Longer length fields may be required for longer codebooks in the beginning of a PP header. This may result in a slight drop in the achieved efficiency when all users are idle or when silence is present. However, since the bandwidth is not constrained in that case, the expansion introduced by the added length field is immaterial.

There are also multiple ways to achieve the above functionality without a length field. One way is to arrange PP header bits in a hierarchy so that all the first bits of a corresponding PP header are put first; then all the second bits are put second, and so on. Since the prefix of a codeword cannot be a codeword, this scheme will uniquely identify compressed patterns without requiring a length field. Another way to achieve the above functionality is to add data bits to the payload in the reverse order of PP header bits. Decoding may be performed until there are no more data bits to compress and only ones are left in the PP header bits. Either of these schemes will improve bandwidth for the high user activity case (e.g. by about 0.25%) compared to the length field case. However, these schemes may require additional processing that may not be useful for the case when the PP header is in error, and the frame is discarded. This is because it will not be possible to determine if the PP header is in error, until decompression is achieved. Depending on processing capabilities of the implemented architecture, it might be advantageous to add length field or to not add it.

Such a mechanism may be easy to implement and it is lossless. Thus, information that is received at one point is sent downstream in a manner that will preserve its integrity. Communication system 10 provides an architecture in which data that is received at one end is renewed at the other. This mechanism is simplistic, in that it does not involve the monitoring or maintenance of state conditions (e.g. which subframe was involved, the state of the transmission, the state of receiver, etc.).

If for a particular reason, it is desirable to use fixed-length codebook in some scenarios, then either one bit in the header can be used to indicate the scheme being used for a particular frame (variable or fixed-length codebook) or the codebook type can be negotiated. It is also possible to negotiate use of a particular codebook in the scheme.

It is critical to note that table 70 may be changed considerably, as table 70 offers only one example mapping for incoming bit patterns. Any number of other bit patterns may be readily accommodated by communication system 10 and are, therefore, included in the broad scope of its teachings. These pattern matches may be based on particular communication needs or on the prevalence of commonly reoccurring bit patterns in a given communications architecture. Additionally, the attached header bits may also provide E1/T1 line conditions and alarms. Also, additional bits may be added to the header bits in order to provide any number of functions, such as control parameters, the state of the given communication link, the condition of the E1/T1 line, the condition of an alarm, or the identification of a certain packet. Thus, these extra bits may provide any suitable additional information that may be relevant to a communication session occurring in communication system 10.

Figure 3:
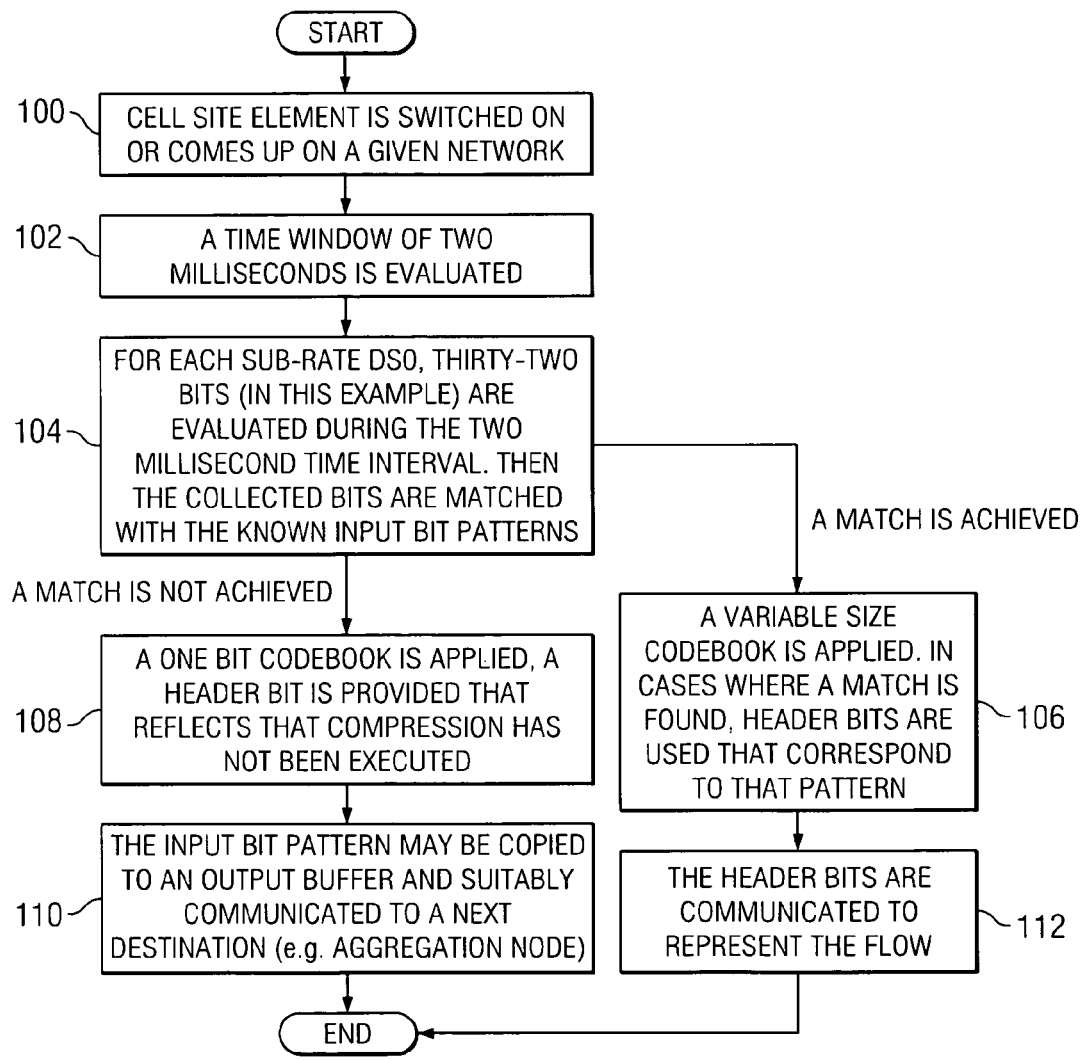
FIG. 3 is a simplified flowchart illustrating a series of example steps associated with the communication system.

Before turning to FIG. 3, it is critical to note that the use of the terms 'aggregation node' and 'cell site element' herein in this document only connotes an example representation of one or more elements associated with base transceiver station 16 and base station controller 24. These terms have been offered for purposes of example and teaching only and do not necessarily imply any particular architecture or configuration. Moreover, the terms 'cell site element' and 'aggregation node' are intended to encompass any network element operable to facilitate a data exchange in a network environment. Accordingly, cell site element 18 and aggregation node 22 may be routers, switches, bridges, gateways, interfaces, or any other suitable module, device, component, element or object operable to effectuate one or more of the operations, tasks, or functionalities associated with compressing data as implied, described, or offered herein.

Each of these elements may include a compressor and/or a decompressor where appropriate. Additionally, each of these elements may include a pattern matching module 60, which includes a table 70. In an example embodiment, pattern matching module 60 reflects software included in cell site element 18 and/or aggregation node 22. This software may be used to effectuate the code-based compression for voice or packet data applications. Alternatively, such code-based compression and multiplexing may be achieved by any suitable hardware, component, device, application specific integrated circuit (ASIC), additional software, processor, algorithm, erasable programmable ROM (EPROM), electrically erasable programmable ROM (EEPROM), or any other suitable object that is operable to facilitate such operations. Considerable flexibility is provided by the structure of cell site element 18 and aggregation node 22 in the context of communication system 10. Thus, it can be easily appreciated that such a function could be provided external to cell site element 18 and aggregation node 22. In such cases, such a functionality could be readily embodied in a separate component, device, or module.

FIG. 3 is a simplified flowchart illustrating a series of example steps associated with a method for compressing and multiplexing data in a communications environment. The flowchart of FIG. 3 is just one example that only illustrates some of the teachings of communication system 10. The method addresses one type of compression, but may be readily used with numerous other types where appropriate. The method may begin at step 100, where cell site element 18 is switched on or comes up on a given network. Once cell site element 18 comes up, a time window of two milliseconds is evaluated at step 102.

For each subrate DS0, thirty-two bits (in this example) are evaluated during the two millisecond time interval. Then the collected bits are matched with the known input bit patterns (of pattern matching module 70) at step 104. In cases where a match is found, a header bit is used that corresponds to that pattern at step 106. In step 108, a header bit (a one-bit codebook) is provided that reflects that compression has not been executed for this pattern. Thus, cell site element 18 may send a stream that includes a header bit indicating that the subsequent (uncompressed) communications flow will soon be delivered.

Step 110 reflects this case where the flow is substantially unmodified and communicated to a next destination. In such an operation, the input bit pattern may be copied to an output buffer and suitably communicated to a next destination, as illustrated by step 110. Note that where no match exists, other compression protocols may be invoked to compress the data and then to communicate it to its intended destination.

Step 106 illustrates the scenario in which a match is found. Thus, in step 106 a variable size codebook is applied. Header bits are then used that correspond to that pattern. Note that a variable size codebook is applied for the case of stateful or stateless compression. Thus, the variable size codebook is universally applied, but the determination of whether or not to send the associated bits is dependent on the code.

Step 112 represents the scenario where a match was found and the header bits are communicated to a next destination. The header bits reveal (or represent) the underlying data flow that was received.

Each subrate DS0 may be evaluated in this fashion in order to generate a large packet for subsequent communication. The multiplexed packet may include an additional header bit that indicates the state of the E1/T1 line, the circuit ID, etc. Additionally at the compressor, on top of the multiplexed packet, an IP header may also be included (which may be further compressed). At a corresponding decompressor, the IP header may be decompressed and the header byte (indicating alarm conditions, state of the line, etc.) may be removed and passed on such that it may be later included in a transmission of an outgoing packet. The header bits may then be evaluated in order to generate (or replicate) data bits that correspond to the pattern that matches the header bits. These bits may then be passed on to a buffer and placed in a suitable format to be communicated at the output to a next destination.

Some of the steps illustrated in FIG. 3 may be changed or deleted where appropriate and additional steps may also be added to the flowchart. These changes may be based on specific communication system architectures or particular networking arrangements or configurations and do not depart from the scope or the teachings of the present invention.

Although the present invention has been described in detail with reference to particular embodiments illustrated in FIGS. 1 through 3, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing and compression architectures. In addition, any of the described elements may be provided as separate external components to communication system 10 or to each other where appropriate. The present invention contemplates great flexibility in the arrangement of these elements as well as their internal components.

In addition, although the preceding description offers a compression protocol to be implemented with particular devices (e.g. aggregation node 22 and cell site element 18), the compression/suppression protocol provided may be embodied in a fabricated module that is designed specifically for effectuating the techniques discussed above. Moreover, such a module may be compatible with any appropriate protocol, other than those discussed herein, which were offered for purposes of teaching and example only.

Additionally, it should be recognized that table 70 has been offered for purposes of example and teaching only. Table 70 is somewhat simplistic, but could be added to or made more complex in order to achieve other pattern matching operations in accordance with the teachings of the present invention. Moreover, the PP header bit representation has been offered for purposes of brevity and clarity and could be readily replaced with a longer bit pattern to accommodate more sophisticated matching operations, to provide for more pattern matching possibilities, or to signal other information pertinent to such communications. Table 70 is malleable and offers considerable flexibility and, hence, should be recognized and construed as such.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for communicating data, comprising:
a cell site element associated with a base transceiver station and operable to:
receive a plurality of bits associated with a communications flow over a Digital Signal 0 (DS0) channel;
identify a submultiplexing scheme associated with the communications flow over the DS0 channel;
determine if a variable size codebook includes a mapping of the plurality of bits associated with the communications flow over the DS0 channel to a selected one of a plurality of bit patterns, each of the plurality of bit patterns mapped to a selected one of a plurality of payload present (PP) header bit patterns, each PP header bit pattern comprising two or more bits, each PP header bit pattern having a size associated with how frequently its mapped bit pattern is estimated to occur;
if the variable size codebook includes the mapping of the plurality of bits to the selected one of the plurality of bit patterns:
communicate the PP header bit pattern mapped to the selected bit pattern in place of the plurality of bits associated with the communications flow, the bit pattern including one or more bits indicating the identified submultiplexing scheme; and
if the variable size codebook fails to include the mapping:
communicate one bit indicating that the corresponding communications flow is uncompressed.

2. The apparatus of claim 1, wherein the PP header bit pattern may be received and evaluated in order to restore the plurality of bits associated with the communications flow.

3. The apparatus of claim 1, wherein the PP header bit pattern is encoded in two parts, part one of the PP header bit pattern indicating the submultiplexing scheme, part two of the PP header bit pattern being dependent on a corresponding state machine and being different for different subrates.

4. The apparatus of claim 1, the cell cite element further operable to:
determine whether the submultiplexing scheme is identified by one or more previous frames; and in response to determining that the submultiplexing scheme is identified by one or more previous frames, suppress the one or more bits indicating the identified submultiplexing scheme.

5. The apparatus of claim 1, wherein a number of additional 1 bits are added to the PP header bit pattern such that byte alignment is achieved.

6. The apparatus of claim 1, wherein the PP header bit pattern is protected by a cyclic redundancy check.

7. The apparatus of claim 1, wherein one bit may be used in a PP control header bit to indicate a scheme being used for a particular frame, the scheme indicating either the fixed size codebook or a variable size codebook.

8. The apparatus of claim 1, further comprising:
an aggregation node associated with a base station controller and operable to communicate with the cell site element.

9. The apparatus of claim 1, wherein a length field is included in the PP header bit pattern that allows for a determination of a length of the PP header bit pattern.

10. The apparatus of claim 1, wherein PP header bits are arranged in a hierarchy such that first bits of the PP header bit pattern are positioned first and second bits of the PP header bit pattern are positioned second.

11. The apparatus of claim 1, wherein data bits are added to a payload associated with the PP header bit pattern in a reverse order, and wherein the data bits are decoded until there are no remaining bits to be compressed and only the PP header bit pattern remains.

12. A method for communicating data, comprising:
receiving, at a cell site element associated with a base transceiver station, a plurality of bits associated with a communications flow over a Digital Signal 0 (DS0) channel;
identifying a submultiplexing scheme associated with the communications flow over the DS0 channel;
determining if a variable size codebook includes a mapping of the plurality of bits associated with the communications flow over the DS0 channel to a selected one of a plurality of bit patterns, each of the plurality of bit patterns mapped to a selected one of a plurality of payload present (PP) header bit patterns, each PP header bit pattern comprising two or more bits, each PP header bit pattern having a size associated with how frequently its mapped bit pattern is estimated to occur;
if the variable size codebook includes the mapping of the plurality of bits to the selected one of the plurality of bit patterns:
communicating the PP header bit pattern mapped to the selected bit pattern in place of the plurality of bits associated with the communications flow, the bit pattern including one or more bits indicating the identified submultiplexing scheme; and
if the variable size codebook fails to include the mapping, communicating one bit indicating that the corresponding communications flow is uncompressed.

13. The method of claim 12, further comprising:
receiving the PP header bit pattern; and
evaluating the PP header bit pattern in order to restore the plurality of bits associated with the communications flow.

14. The method of claim 12, further comprising:
determining whether the submultiplexing scheme is identified by one or more previous frames; and in response to determining that the submultiplexing scheme is identified by one or more previous frames, suppressing the one or more bits indicating the identified submultiplexing scheme.

15. The method of claim 12, further comprising:
encoding the PP header bit pattern in two parts, part one of the PP header bit pattern indicating the submultiplexing scheme, part two of the PP header bit pattern being dependent on a corresponding state machine and being different for different subrates.

16. The method of claim 12, further comprising:
adding a number of additional 1 bits to the PP header bit pattern such that byte alignment is achieved.

17. The method of claim 12, further comprising:
providing a length field in the PP header bit pattern that allows for a determination of a length of the PP header bit pattern.

18. The method of claim 12, further comprising:
arranging PP header bits in a hierarchy such that first bits of the PP header bit pattern are positioned first and second bits of the PP header bit pattern are positioned second.

19. The method of claim 12, further comprising:
adding data bits to a payload associated with the PP header bit pattern in a reverse order; and
decoding the data bits until there are no remaining bits to be compressed and only the PP header bit pattern remains.

20. A system for communicating data, comprising:
means for receiving a plurality of bits associated with a communications flow over a Digital Signal 0 (DS0) channel;
means for identifying a submultiplexing scheme associated with the communications flow over the DS0 channel;
means for determining if a variable size codebook includes a mapping of the plurality of bits associated with the communications flow over the DS0 channel to a selected one of a plurality of bit patterns, each of the plurality of bit patterns mapped to a selected one of a plurality of payload present (PP) header bit patterns, each PP header bit pattern comprising two or more bits, each PP header bit pattern having a size associated with how frequently its mapped bit pattern is estimated to occur;
if the variable size codebook includes the mapping of the plurality of bits to the selected one of the plurality of bit patterns:
means for communicating the PP header bit pattern mapped to the selected bit pattern in place of the plurality of bits associated with the communications flow, the bit pattern including one or more bits indicating the identified submultiplexing scheme; and
if the variable size codebook fails to include the mapping, means for communicating one bit indicating that the corresponding communications flow is uncompressed.

21. The system of claim 20, further comprising:
means for receiving the PP header bit pattern;
means for evaluating the PP header bit pattern in order to restore the plurality of bits associated with the communications flow.

22. The system of claim 20, further comprising:
means for encoding the PP header bit pattern in two parts, part one of the PP header bit pattern indicating the submultiplexing scheme, part two of the PP header bit pattern being dependent on a corresponding state machine and being different for different subrates.

23. The system of claim 20, further comprising:
means for adding data bits to a payload associated with the PP header bit pattern in a reverse order; and means or decoding the data bits until there are no remaining bits to be compressed and only the PP header bit pattern remains.

24. The system of claim 20, further comprising:

means for adding a number of additional bytes to the PP header bit pattern such that byte alignment is achieved.

25. A non-transitory computer readable medium encoded with software for communicating data, the software comprising computer code such that when executed is operable to:

receive a plurality of bits associated with a communications flow over a Digital Signal 0 (DS0) channel;

identify a submultiplexing scheme associated with the communications flow over the DS0 channel;

determine if a variable size codebook includes a mapping of the plurality of bits associated with the communications flow over the DS0 channel to a selected one of a plurality of bit patterns, each of the plurality of bit patterns mapped to a selected one of a plurality of payload present (PP) headers, each PP header comprising two or more bits, each PP header having a size associated with how frequently its mapped bit pattern is estimated to occur;

if the variable size codebook includes the mapping of the plurality of bits to the selected one of the plurality of bit patterns:

communicate the PP header bit pattern mapped to the selected bit pattern in place of the plurality of bits associated with the communications flow, the bit pattern including one or more bits indicating the identified submultiplexing scheme; and if the variable size codebook fails to include the mapping, communicate one bit indicating that the corresponding communications flow is uncompressed.

26. The medium of claim 25, wherein the code is further operable to:

receive the PP header bit pattern; and evaluate the PP header bit pattern in order to restore the plurality of bits associated with the communications flow.

27. The medium of claim 25, wherein the code is further operable to:

encode the PP header bit pattern in two parts, part one of the PP header bit pattern indicating the submultiplexing scheme, part two of the PP header bit pattern being dependent on a corresponding state machine and being different for different subrates.

28. The medium of claim 25, wherein the code is further operable to:

determine whether the submultiplexing scheme is identified by one or more previous frames and;

in response to determining that the submultiplexing scheme is identified by one or more previous frames, suppress the one or more bits indicating the identified submultiplexing scheme.

29. The medium of claim 25, wherein the code is further operable to:

add a number of additional bytes to the PP header bit pattern such that byte alignment is achieved.

* * * * *